US010728397B1

(12) United States Patent
Kendrick

(10) Patent No.: US 10,728,397 B1
(45) Date of Patent: Jul. 28, 2020

(54) BUNDLING OF SERVICES THROUGH A MOBILE PLATFORM

(71) Applicant: ROK Mobile International Ltd., Culver City, CA (US)

(72) Inventor: Jonathan Kendrick, Culver City, CA (US)

(73) Assignee: ROK MOBILE INTERNATIONAL LTD, Culver, CA (US)

(*) Notice: Subject to any disclaimer, the term of this patent is extended or adjusted under 35 U.S.C. 154(b) by 0 days.

(21) Appl. No.: 16/248,445

(22) Filed: Jan. 15, 2019

(51) Int. Cl.
| | |
|---|---|
| *H04M 15/00* | (2006.01) |
| *G06Q 30/04* | (2012.01) |
| *G06Q 20/28* | (2012.01) |
| *H04W 4/24* | (2018.01) |
| *G06Q 30/02* | (2012.01) |
| *G06F 3/0481* | (2013.01) |
| *H04W 4/12* | (2009.01) |

(52) U.S. Cl.
CPC ............ *H04M 15/61* (2013.01); *G06Q 20/28* (2013.01); *G06Q 30/0236* (2013.01); *G06Q 30/04* (2013.01); *H04W 4/12* (2013.01); *H04W 4/24* (2013.01); *G06F 3/04817* (2013.01)

(58) Field of Classification Search
CPC ... H04M 15/61; G06Q 30/0236; G06Q 20/28; G06Q 30/04; H04W 4/24; H04W 4/12; G06F 3/04817
See application file for complete search history.

(56) References Cited

U.S. PATENT DOCUMENTS

| | | | |
|---|---|---|---|
| 2009/0171838 A1* | 7/2009 | Liu ........................ | G06Q 20/10 705/40 |
| 2011/0145086 A1* | 6/2011 | Valdes .................... | G06Q 20/10 705/26.1 |
| 2017/0078859 A1* | 3/2017 | Kendrick ................ | H04W 4/16 |
| 2017/0169458 A1* | 6/2017 | Singh ................. | G06Q 30/0234 |

* cited by examiner

*Primary Examiner* — Marisol Figueroa
(74) *Attorney, Agent, or Firm* — Ballard Spahr LLP

(57) ABSTRACT

A telecommunication service provider agrees to a prepaid plan including phone, text and data services, which it provides to a user through a mobile device of the user. A computing system of the telecommunication service provider can send a notification to the user's mobile device that refers to benefits and contains a launch prompt. When the launch prompt is selected by the user, an application program is automatically launched in the mobile device, or a browser in the mobile device is automatically navigated to a website, which prompts the user to identify herself using personal information. In response, the computing system can signal the mobile device to display to the user an offer of i) a pre-bundled group of, or ii) an individually selectable variety of, products or services.

19 Claims, 13 Drawing Sheets

Brand Name
Telecommunications Services

Composite Bill

Jan 1, 2016

Account number: 1234 | PIN: *****

Mobile phone number: 310-321-1234
Name: John Doe
Account Address: 123 Maple Street City, State Postal Code
Contact number: 310-321-1234
Account notifications: 310-321-1234
Bill delivery option: john.doe@emailaddress.com

SUMMARY OF CHARGES

Previous Balance
$0.00

USAGE: CALLS/TEXTS

| | | |
|---|---|---|
| 1,254 USAGE MINUTES | ------------------ | $31.24 |
| 54 Texts | ------------------------- | $3.25 |
| EQUIPMENT | -------------------------- | $0.00 |

} 142

143

Benefits - Group Price - bundled  ---------- $15.50
Road Side Protect
Accidental Death Insurance
Telemedicine
ID Theft Insurance

146

Current Balance  ----------------------- $49.99    Due Date: Feb 1, 2016

FIG. 5

BUNDLING OF SERVICES THROUGH A MOBILE PLATFORM

FIELD

This disclosure relates to a system and method in a mobile telecommunications platform for enabling a mobile device of an unknown user of a mobile telecommunication service plan to select a pre-bundled set of, or individually selectable variety of, products and services that are offered to the user at a group rate.

BACKGROUND

A difficult obstacle of telecommunication providers that offer prepaid cellular telecommunication services is churn. Churn occurs when the service provider loses a customer to another service provider. Providers of prepaid cellular phone services are highly susceptible to churn because of the inherent service model, which allows a user to purchase and use a cellular phone with all of the standard features included in most cellular phones (including voice, text, and data (also referred to as Internet access) services) without the requirement that the user subscribe to a long-term service contract or be subjected to overage charges. The ability to purchase a prepaid cellular phone and service is straightforward. Such phones are available over the counter at many brick-and-mortar stores where a person can purchase a prepaid phone and its associated service. The purchase may occur with various means of payment such as cash, debit card, and credit card. As a result of poor credit, many users' only means of payment is cash. In that case, users may only be identifiable to service providers by the mobile telephone number that is assigned to the phone. The phone is programmed with the assigned phone number. The telecommunication service provider is paid up front, and then the prepaid user is allotted a specified number of minutes, text messages and data usage for the assigned phone number. Costs of use are then deducted from the amount that has been prepaid by the user. When the user reaches a $0 balance, she is no longer able to use the phone for telecommunication services.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 5 illustrates an example of content of an example composite bill or invoice, in accordance with one or more embodiments of the disclosure.

DETAILED DESCRIPTION

Figure 1:
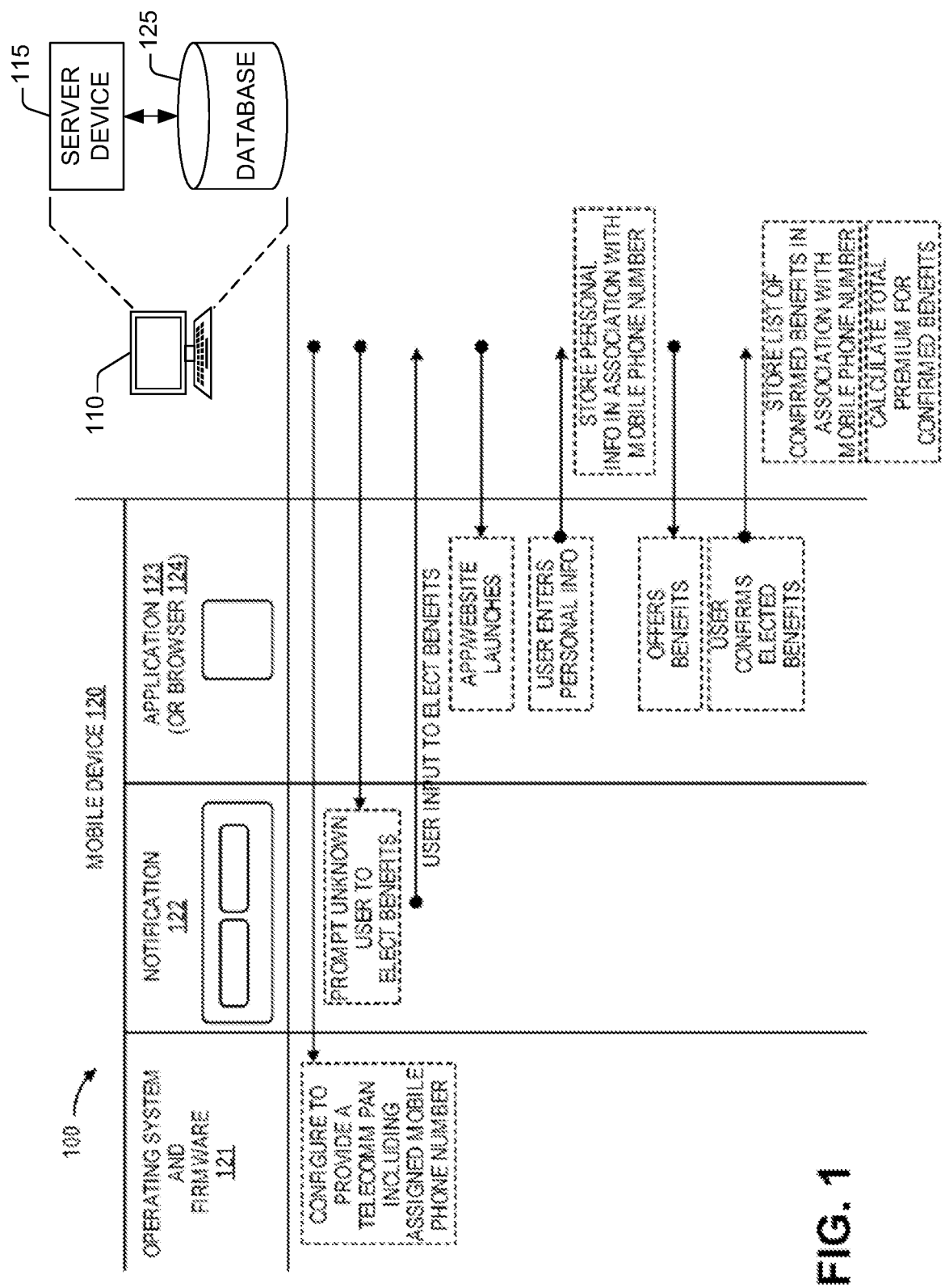
FIG. 1 illustrates an example of a system for enabling a user device to select a pre-bundled or individually selectable variety of products and services, in accordance with one or more embodiments of the disclosure.

Several embodiments of the invention with reference to the appended drawings are now explained. Whenever the shapes, relative positions and other aspects of the parts described in the embodiments are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

It is to be understood that the methods and systems of this disclosure are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, elements, operations, or steps. Similarly, the word "include" and variations of such word, such as "including" and "includes," also means "including by not limited to," and is not intended to exclude, for example, other components, elements, operations, or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 illustrates an example of a system 100 (mobile platform) for enabling a mobile device 120 to select insurance and/or other products and services, in accordance with one or more embodiments of this disclosure. The insurance and other products and services are generically referred to as products and can be specific to a user account corresponding to the mobile device 120. The products can be offered by the same service provider that is providing a telecommunication service to the user. In some instances, the products can be pre-bundled. Thus, the mobile device 120 can select a defined bundle. In other instances, the mobile device 120 can individually select one or more products from a bundle or a defined variety of products.

Through the use of mobile messaging technologies, the system 100 may enable the telecommunication service provider to reduce the level of churn that results from a lack of commitment by their users, by making it easier for the user to sign up for important non-telecommunication related products (the "benefits" as referred to here) such as insurance products, without the user having to spend hours researching the Web to find a reasonable solution from amongst those being offered by numerous insurance vendors. In addition, the system 100 is configured so that the pre-bundled and pre-determined variety of benefits (such as non-telecommunication products and services) that can be offered to a user dynamically change as the user's situation changes, while remaining a customer of the telecommunication service provider. Accordingly, such benefits can better suit the changing lifestyle and/or desires of the user. Upon or after the elected benefits have been confirmed (by the mobile device 120 or another user device, for example) the elected benefits can be provided through the telecommunication service provider and charges for those benefits can be made available in a composite bill or invoice that contains both first charges for the telecommunication service and second charges for the non-telecommunication benefits.

As is illustrated in FIG. 1, the system 100 includes a service provider system 110 and a mobile device 120. As will be described in greater detail below, the mobile device 120 includes the necessary operating system 121 and other software components. The software components can include an application program 123 (e.g., a mobile application), a web browser 124, or an application programming interface (API) that can permit or otherwise facilitate the mobile device 120 to communicate with the service provider system 110. Communication between the mobile device 120 and the service provider system 110 can be implemented over any suitable computer networking protocol suite (e.g., HTTP over TCP/IP over a cellular data connection, short message service (SMS) or multimedia messaging service (MMS) messaging over a cellular or mobile communication link. The software components also can permit or otherwise facilitate the mobile device 120 to display received notifications 122 to an end-user. The software components can further permit or otherwise facilitate receiving manual selections and/or other data from the end-user by means of a user interface. In some embodiments, the user interface can be embodied in or can include a touchscreen of a display device integrated in the mobile device 120 or coupled thereto. Each element of the system 100 will be described below by way of example.

The service provider system 110 can be embodied in or can include one or more server devices 115 (generically referred to as server device 115). The service provider system 110 also can include one or more memory elements 125 (generically referred to as database 115) retained in one or more memory devices. More specifically, in one embodiment, the service provider system 110 can be embodied in a stand-alone server device 115 that includes the database 125. The database 115 is referred to here as a "central" database, due to the one-to-many nature of the communications between the service provider system 110 and the numerous instances of the mobile device 120 (the latter being associated with their respective users). In other embodiments, the service provider system 110 can be embodied in a server device 115 that is functionally coupled to a database 125. In yet other embodiments, the service provider system 110 can be embodied in or can include a network of server devices 115 and a network of databases 115, configured to operate as a master in a master-slave relationship with the mobile device 120. Regardless the architecture, the service provider system 110 is administered by the telecommunication service provider.

Figure 1A:
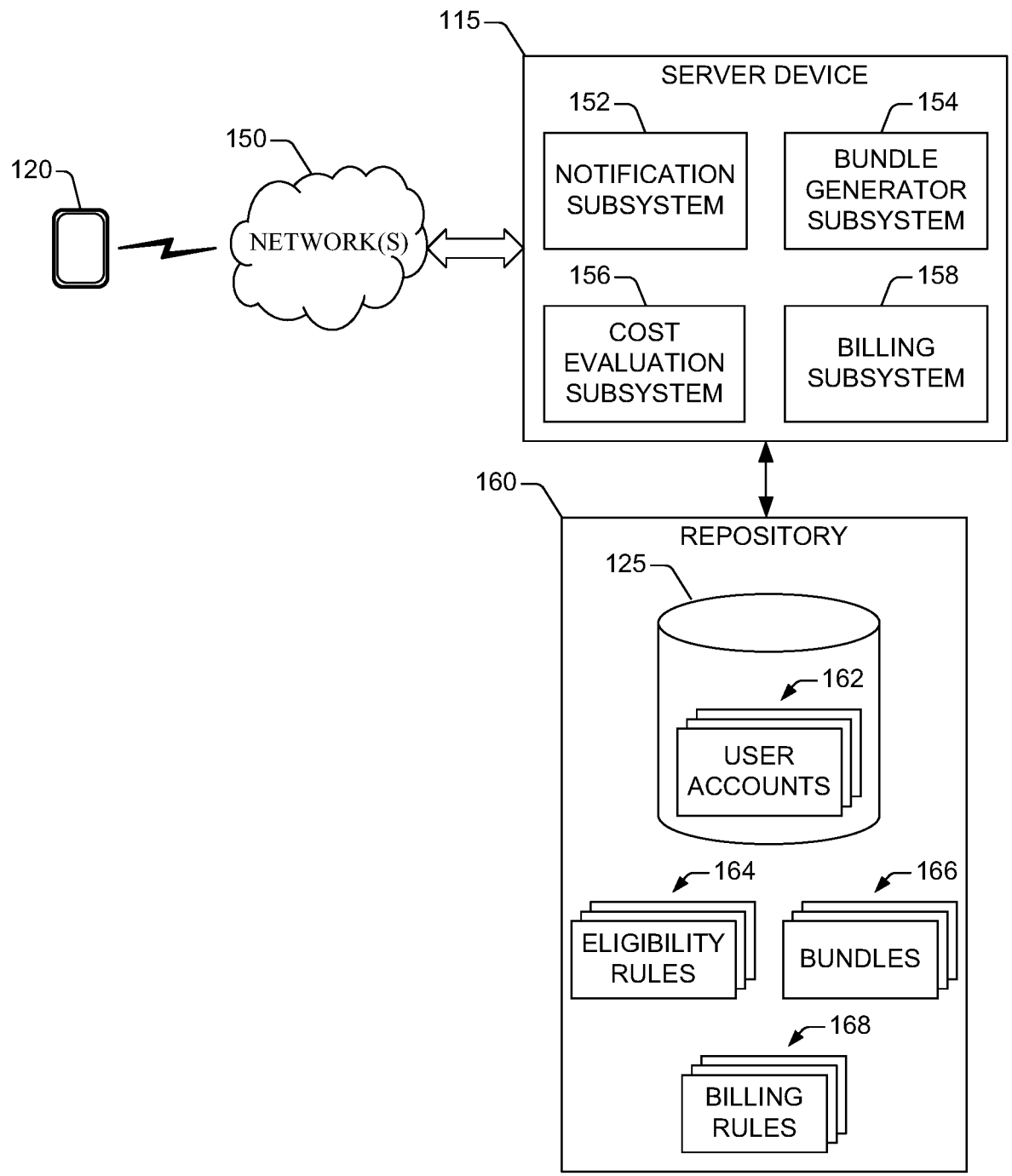
FIG. 1A illustrates an example of service provider system in accordance with one or more embodiments of the disclosure.

The service provider system 110 can include one or more processors configured or otherwise programmed to access and configure the mobile device 120, via the operating system 121, for example, to be used for a prepaid telecommunication plan (also referred to here as a prepaid phone plan) including the provision of voice service, messaging service (e.g., text service), and data service to the mobile device 120. In some embodiments, the service provider system 110 can include one or more programmed processors that are configured or otherwise programmed to access as many instances of the mobile device 120 as desired by an administrator of the telecommunication service provider, each instance being associated with a respective user (customer) of telecommunication services provided by the same service provider. As is illustrated in FIG. 1A, a group of networks 150 can functionally couple (e.g., communicatively couple) the mobile device 120 and the server device 115, permitting such programmed processor(s) to access the mobile device 120. The group of networks 150 can include wireline networks and/or wireless networks having respective footprints (e.g., small-cell network, cellular network, local area network, enterprise network, metropolitan area network, wide area network (WAN) (e.g., the Internet), or the like.

With further reference to FIG. 1, the database 125, to which the service provider system 110 has access, stores a list of identifiers that are in effect associated with known and unknown (or anonymous) users of mobile devices, respectively. Each identifier is associated with a respective mobile device or respective user of the mobile device—see FIG. 2. Each identifier may be a mobile phone number and may also be associated with a user account number (not shown) generated by the telecommunication service provider. The user account number can be, for example, unique to each mobile phone number.

As mentioned, a user of the mobile device 120 may be "known" (status=KNO in FIG. 2) in that in addition to the mobile phone number, at least the full name and residence ZIP code of the user are also available to the service provider system 110. The full name and residence ZIP code can be stored in the database 125 as being associated with the mobile phone number that is assigned to the mobile device 120. In some embodiments, the full name and residence ZIP code can be retained in a user account within a group of user accounts 162, as is illustrated in FIG. 1A.

Figure 2:
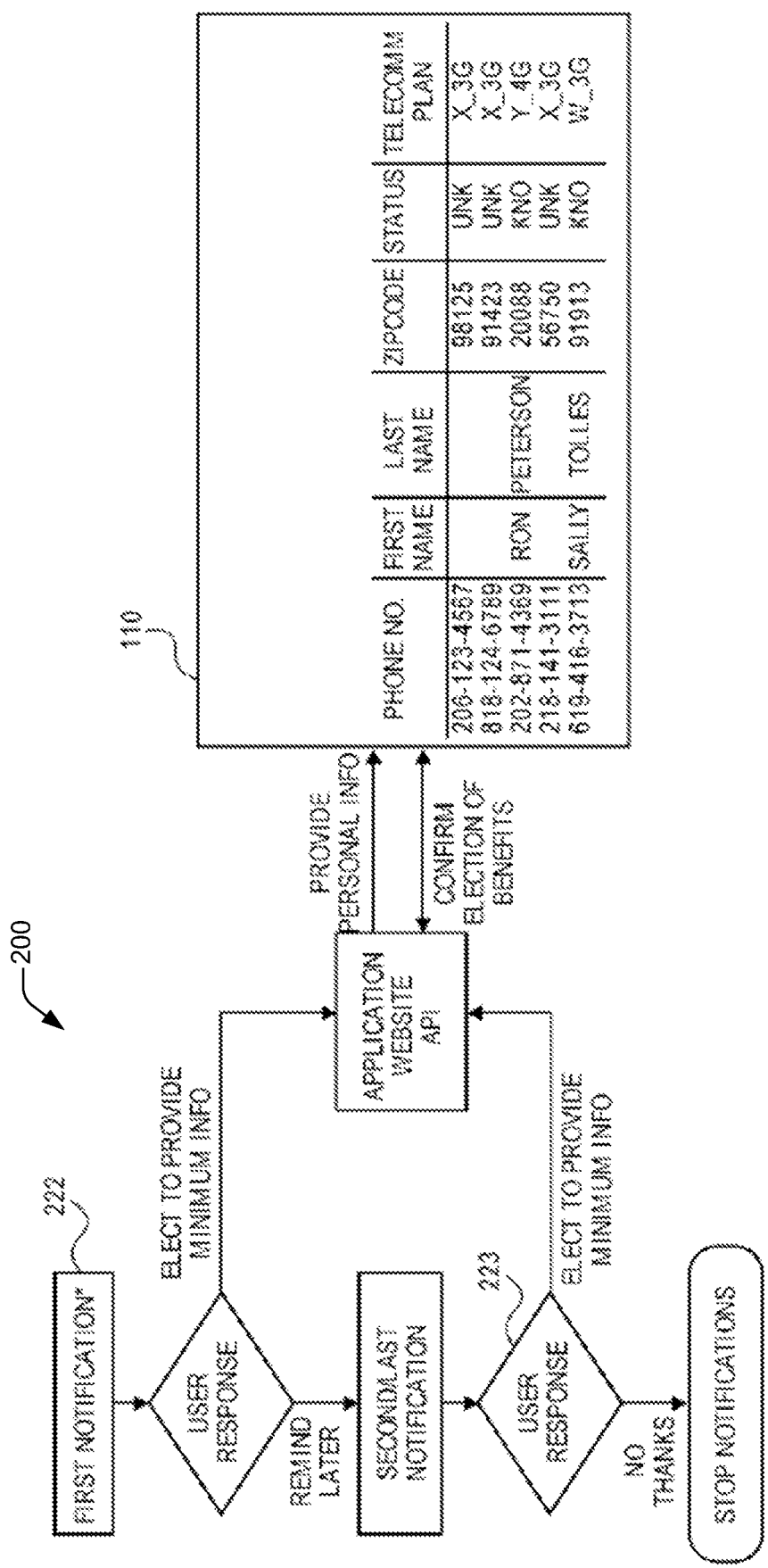
FIG. 2 illustrates an example of a method for selecting a pre-bundled or individually selectable variety of products and services, in accordance with one or more embodiments of the disclosure.

It is also contemplated that a user may be "unknown" (status=UNK in FIG. 2). In such scenario, a user account of the user is identifiable only by a customer identification code that can be stored in the database 125. The customer identification code may be, for example, a randomly generated number, or it may be the mobile phone number that is assigned to the mobile device 120.

In some embodiments, the list of identifiers that is stored in the database 125 may also include information on the particular mobile or cellular telecommunication service plan (the "telecomm plan" field shown in FIG. 2) that is assigned to service the mobile device 120. Such information may be entered into the database 125 at the time a user account is configured with either a prepaid phone plan or an installment service contract for obtaining telecommunication services from the service provider, via the mobile device 120. The telecommunication service can include, for example, voice, text, and/or cellular data.

The service provider system 110 can determine if a user account is eligible for a benefit. To that end, in one embodiment, as is illustrated in FIG. 1A, the server device 115 can include a notification subsystem 152 that can apply an eligibility rule to the user account. The eligibility rule can be retained in one or more memory devices 160 (generically referred to as repository 160). Specifically, the eligibility rule can be retained within one or more memory elements 164 (generically referred to as eligibility rule 164) in the repository 160. In one embodiment, an eligibility rule to qualify a user account for the benefit (to receive an offer from the telecommunication service provider for a pre-bundled set of, or individually selectable variety of, insurance services and/or other products or services) can require that the user account be active with the telecommunication service provider for a minimum period of time ("minimum eligibility period"). For example, the minimum period of time can be uninterrupted and can span 15 days, 20 days, or 30 days from a start date.

In another embodiment, an eligibility rule to qualify for the benefit can dictate that a defined level of prepaid service be retained by a user account in addition to maintaining the user account active for the minimum period of time. A type and/or a scope (or amount) of the benefit can be specific to the level of prepaid service, a time interval during which the user account has been active, or both. Accordingly, several tiers of benefits can be available and the user account can become eligible to one or more of those tiers based at least on level of prepaid service that is retained and/or a time span that the user account has been active.

Furthermore, so as to not harass or otherwise diminish the user experience, the offer of a pre-bundled set, or individually selectable variety, of insurance products and services is made (repeated) only for a limited time after the user becomes eligible ("maximum offer period"), for example 30 days, 45 days, or 60 days from the end of the minimum eligibility period.

With further reference to FIG. 1, the service provider system 110 sends a first notification to the mobile device 120 of an unknown user, to be displayed by the mobile device 120 as a notification 122 to the unknown user. The notification can be sent, for example, within the first half of the billing cycle following the minimum eligibility period (in which the user has maintained an active account with the telecommunication provider). The notification 122 may be sent in accordance with known techniques, for example as a push notification that is based on the earlier installation of an application program 123, which may have been installed into the mobile device 120 upon the user having signed up for an account with the service provider. In addition, or as an alternatively, the notification 122 may be sent as a text message based on the known phone number that has been assigned to the mobile device 120 and which is used as the destination of the text message. As is illustrated in FIG. 1A, in some embodiments, the notification subsystem 152 can generate and can send the notification 122.

The notification 122 may be displayed on a touchscreen display device of the mobile device 120. Any prompt contained in the notification 122 can be "pressed" or otherwise selected by the user. For example, such a prompt can be selected by touching (e.g., tapping or swiping) a corresponding visual element, such as a graphic element, a text element, or another type of indicia or marking that is visible on the touchscreen display device.

To precipitate the user of the mobile device 120 to select a pre-bundled set of, or an individually selectable variety of, insurance products and services, the mobile device 120 first displays or otherwise presents the received notification 122. The notification 122 may include a reminder prompt 136 and a launch prompt 137, both of which are displayed simultaneously upon receipt of the notification 122 in the mobile device 120—see FIG. 3A. The reminder prompt 136 contains text that in effect informs an end-user of the mobile device 120 that selection of the reminder prompt 136 can cause the mobile device 120 to present a reminder at a later time about being eligible to receive the benefit. The launch prompt 137, when pressed or otherwise selected, can cause the mobile device 120 to launch the application program 123 in the mobile device 120. The application program 123 can be launched either as a native application that is stored in the mobile device 120 or as a Web application that is viewable in a web browser 124 that is stored in the mobile device 120. Through these means, for example, the service provider system 110 then performs the rest of the process depicted in FIG. 1 and explained further below, presenting an offer of benefits (insurance products and/or additional services or products, for example) to the user via the application program 123 on the mobile device 120.

Selection of the reminder prompt 136 in the notification 122 can cause (e.g., send an instruction of otherwise signal) the service provider system 110 to create a subsequent notification 122 that can be sent to the mobile device 120 at a later time. The subsequent notification 122 also contains at least the launch prompt 137, as is illustrated in FIG. 3B. A subsequent notification (which may be the second, third, fourth, etc.) may also contain a "Not Interested" prompt (not shown in FIG. 3B). The "Not Interested" prompt may be pressed or otherwise selected if the user is not interested in the benefit (e.g., a pre-bundled or individually selectable variety of products and services). In response to the Not Interested prompt being pressed or otherwise selected in the mobile device 120, the mobile device 120 can cause (e.g., can send an instructions or otherwise signal) the service provider system 110 to stop sending notifications that refer to such an offer (only to the mobile device 120 from which the not interested prompt was signaled, not others that are associated with their respective identifiers in the database).

Figure 3A:
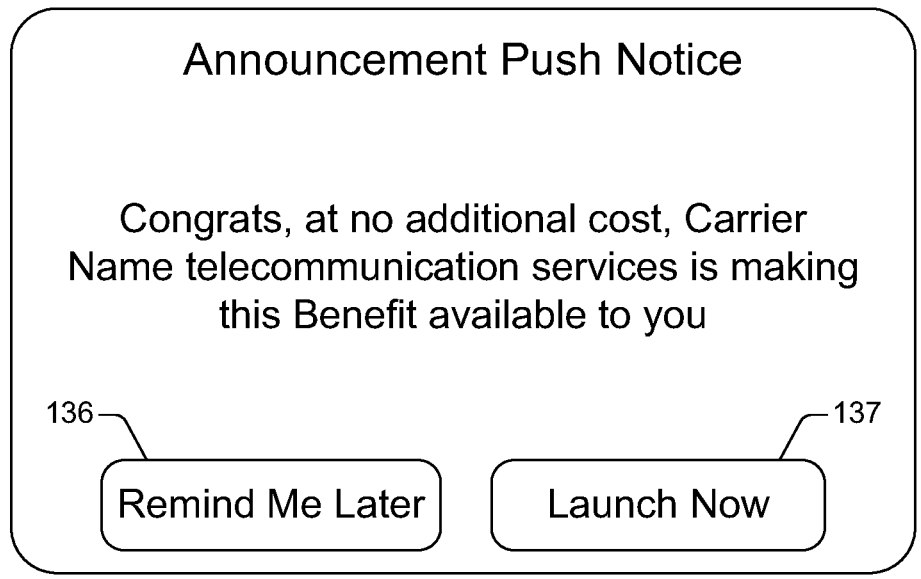
FIG. 3A illustrates an example of the display in the mobile device of example, received notifications, in accordance with one or more embodiments of the disclosure.
Figure 3B:
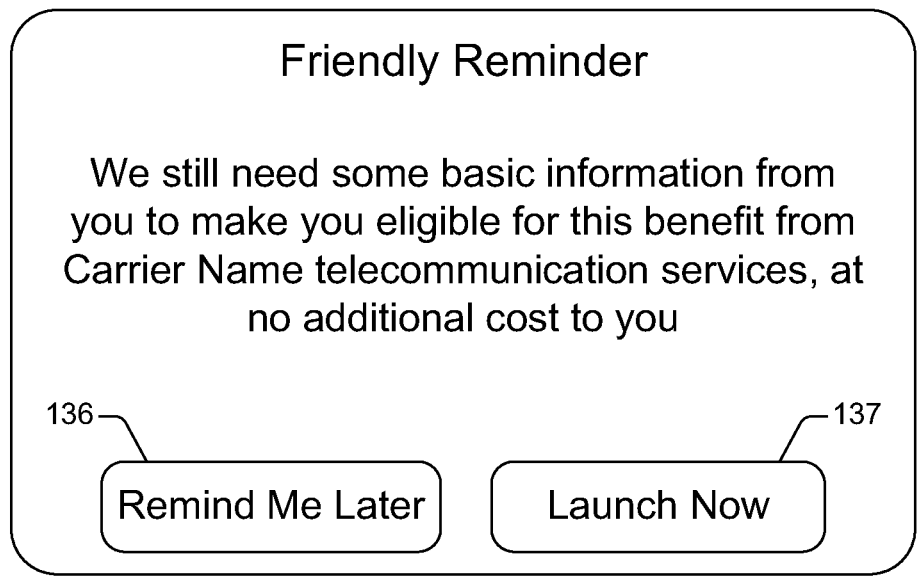
FIG. 3B illustrates another example of the display in the mobile device of example, received notifications, in accordance with one or more embodiments of the disclosure.
Figure 3C:
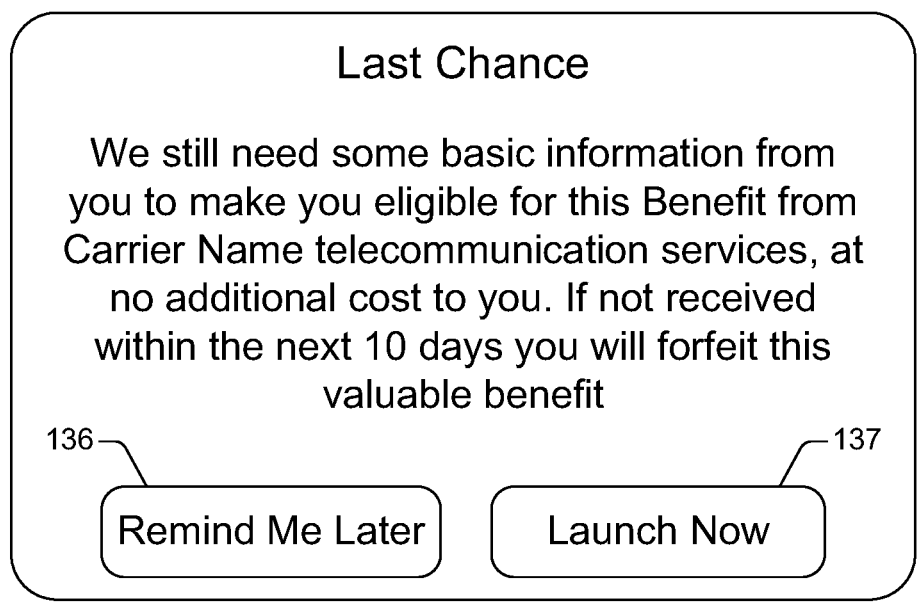
FIG. 3C illustrates yet another example of the display in the mobile device of example, received notifications, in accordance with one or more embodiments of the disclosure.

Also, after a predetermined, maximum number of notifications 122 have been sent to the mobile device 120 without the launch prompt 137 being selected (e.g., no affirmative response is received by the service provider system 110), a final notification 122 is sent—see FIG. 3C—after which no further notifications are sent to the mobile device 120 (that refer to the user being eligible to receive benefit). In some embodiments, the notification subsystem 152 shown in FIG. 1A can generate and can send subsequent notifications. The notification subsystem 152 also can terminate the submission of subsequent notifications to the mobile device 120.

As mentioned, in some embodiments, when the launch prompt 137 is selected, the mobile device 120 responds by launching the application program 123. Execution of the application program 123 can cause the mobile device 130 to present a prompt (e.g., display appropriate selectable text on a touchscreen display device of the mobile device 120) to provide personal information necessary to qualify the user for a pre-bundled or individually selectable variety of insurance products and services and/or other services (see below). Such personal information may include but is not limited to, for example, first name, last name, date of birth, gender, email address, mailing address, beneficiary information, and contact information for the beneficiary. In one embodiment, the following fields or prompts may be displayed by the mobile device 120. Personal information can be entered into the fields, noting especially that the five fields with an asterisk denote the "minimum personal information" needed:

First Name*
Last Name*
Date of Birth*
Mailing (street) Address
City
State Postal Code*
Email Address*
Phone Number In other words, in some embodiments, the mailing (street) address, the mailing city, the mailing state, and the phone number (which is in addition to the user's mobile phone number which is already known to the service provider system 110) are not required in order to receive the benefit offer. Additional optional personal information that may be entered or otherwise received at the mobile device 120 includes a billing address.

The application program 123 then sends the entered personal information to the service provider system 110. In response, the service provider system 110 verifies eligibility of the user to receive an offer of benefits based at least on the minimum personal information that is received. Specifically, the service provider system 110 determines, based at least on the personal information, a group of products that can be included in a benefit for a user account corresponding to the mobile device 120. To that end, in some embodiments, as is shown in FIG. 1A, the server device 115 can include a bundle generator subsystem 154 that receives the personal information and determines the group of products using at least some of the personal information. In one embodiment, the bundle generator subsystem 154 can determine at least one product of the group of products based at least on the geographical information included in the personal information. The geographical information can establish a geographical area corresponding to the user account. The generator subsystem 154 can access a third-party database and/or other information repositories to collect various types of information pertaining to the geographical area. Such information can include demographics, criminality, realestate market (property sizes, property valuations, etc.), school district, a combination thereof, or the like. Thus, in one example, for a user account in a metropolitan area heavily populated, the bundle generator subsystem 154 can include vehicular insurance, rideshare services, and/or catastrophic health insurance in the group of products may be selected.

In another example, for a user account in a geographical area with high criminality, the bundle generator subsystem 154 can include home-security products and/or catastrophic health insurance in the group of products. In yet another example, for a user account in a geographical area having poor engagement in physical activity, the bundle generator subsystem 154 can include wellness products and/or health insurance in the group of products.

In addition, or in some embodiments, the bundle generator subsystem 154 can rely on more complex techniques to determine one or more products based at least on personal information received form the mobile device 120. To that end, for a user account corresponding to the mobile device 120, the bundle generator subsystem 154 can train a machine-learning model that can infer an election of a product based on historical elections in other anonymous user accounts. For instance, the bundle generator subsystem can determine a likelihood that the user account pertains to a defined category of user accounts that have elected a particular type of bundle. In some implementations, the machine-learning model can be trained to classify the user account regardless of geographical location (e.g., ZIP code) of the user account. In other implementations, the machine-learning model can be trained to classify the user account using, at least in part, a defined geographical area.

Figure 4B:
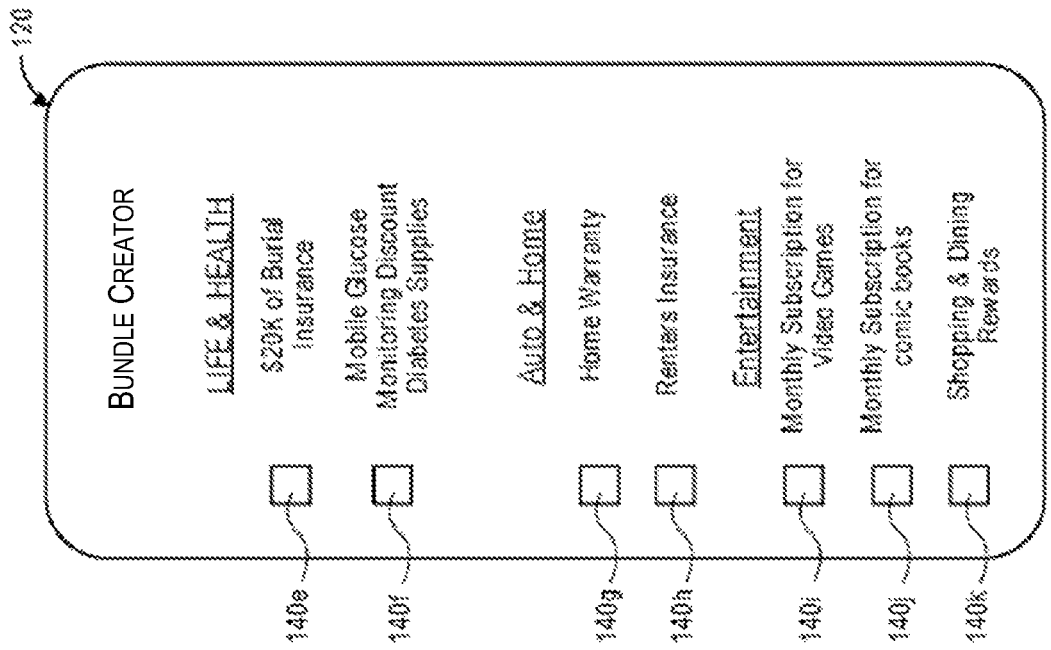
FIG. 4B illustrates another example of a screenshot of the mobile device displaying a variety of individually selectable benefits from which the user can select, in accordance with one or more embodiments of the disclosure.
Figure 4A:
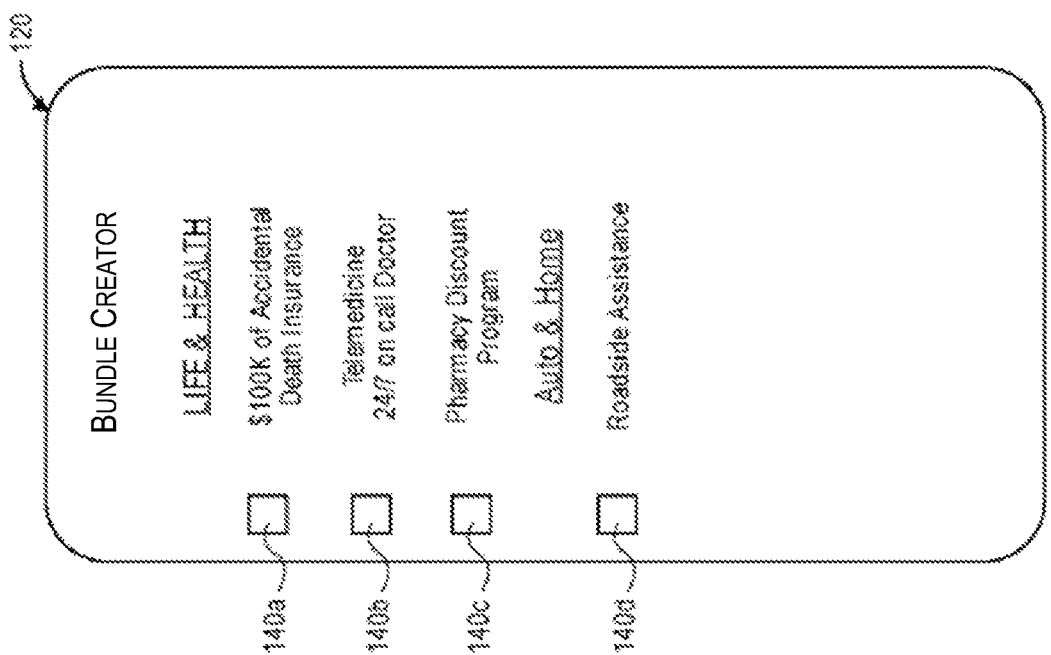
FIG. 4A illustrates an example of a screenshot of the mobile device displaying a variety of individually selectable benefits from which the user can select, in accordance with one or more embodiments of the disclosure.
Figure 4C:
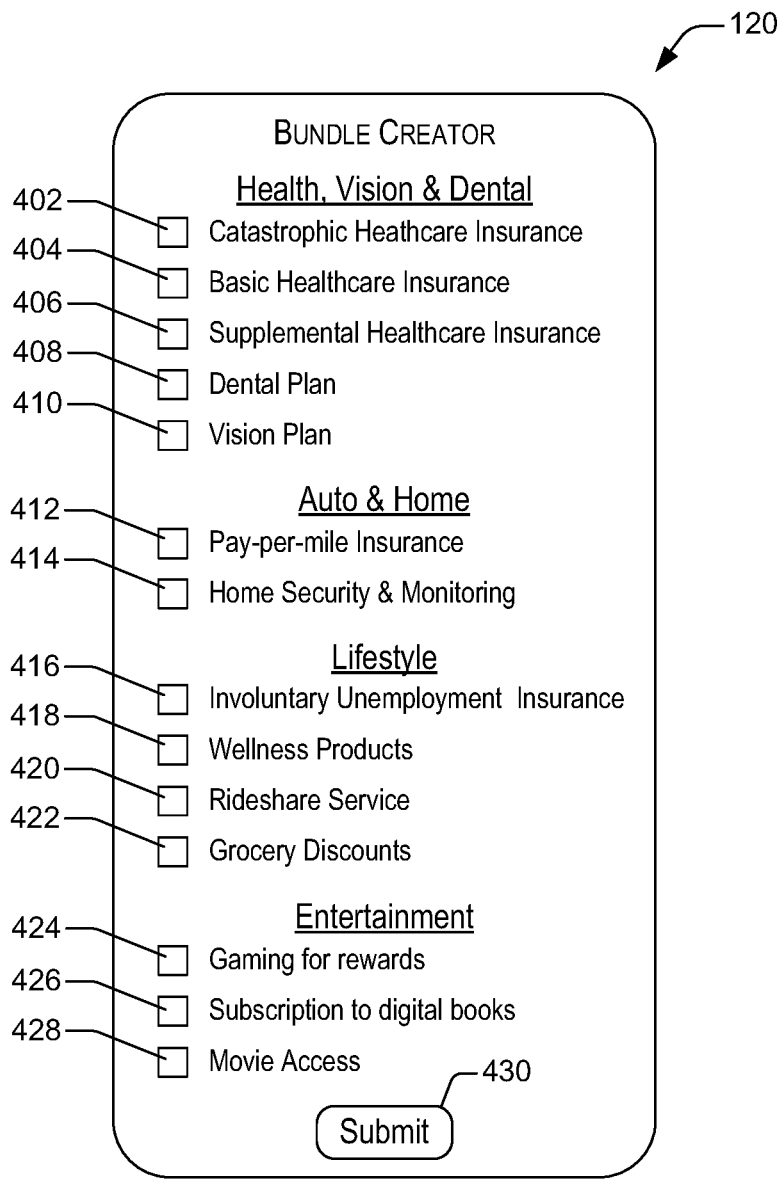
FIG. 4C illustrates yet another example of a screenshot of the mobile device displaying a variety of individually selectable benefits from which the user can select, in accordance with one or more embodiments of the disclosure.

Upon or after a group of products is determined, the service provider system 110 can send to the application program 123 a list indictive of the group of products for which the user would be eligible. FIGS. 4A-4C present example screenshots of the mobile device 120 displaying such a list (received from the service provider system 110, for example) of individually selectable varieties of products and services that can be included in a user account at a group rate. As mentioned, the list of benefits may alternatively, or in addition to the individually selectable variety, include a pre-bundled group of insurance products and services and/or other services being offered to the user at a group rate. These products and services may include, in some embodiments, life insurance; telemedicine; healthcare insurance; a dental plan; a vision plan; roadside assistance; vehicle repair; vehicle maintenance; vehicle insurance; pet insurance; travel insurance; monthly publication subscriptions; subscriptions to digital books or other types of media; and consumer credit monitoring. Each (or, in some embodiments, at least some of these services and products) can include numerous types. For example, healthcare insurance can include catastrophic healthcare insurance, basic healthcare insurance, and/or supplemental healthcare insurance. As another example, vehicle insurance can include vehicle collision insurance and vehicle comprehensive insurance. In some instances, vehicle insurance can be provided as pay-per-mile insurance, where an insured linked to the mobile device 120 can be assessed an insurance premium based at least on a distance traversed by an insured vehicle.

In addition, or in other embodiments, the products and services can include, for example, homeowners insurance; renters insurance; and home security and monitoring. In some instances, discounts for the installation of equipment (e.g., cameras, IR sensor devices, and the like) can be offered as part of home security and monitoring. In addition, or in other instances, a discount or a grace period can be offered as part of the home security and monitoring service.

Further, or in yet other embodiments, the products and services can include involuntary unemployment insurance; wellness products; rideshare services; and grocery discounts. In some instances, a benefit that is part of the rideshare service can include a guaranteed number of free-of-charge rides or a guaranteed number of miles prior to incurring transportation costs. In addition, or in other instances, the benefit can include a defined discount per ride or a defined discount per mile after a free-of-charge rides or miles have been exhausted. Wellness products can include, in some embodiments, information indicative of an estimate of caloric consumption of an end-user of the mobile device 120. In addition, or in other embodiments, the wellness product can include nutritional information (such as macronutrient composition and/or micronutrient composition) of numerous foodstuffs or hyperlinks to such information. Moreover, or in yet other embodiments, the wellness product can include several diet plans that can be specific to dietary preferences (e.g., low-fat diet, low-carbohydrate diet, paleolithic diet, intermittent fasting diet, and the like) and/or dietary restrictions (nut-free diet, gluten-free diet, etc.).

Furthermore, or in still other embodiments, the products and services can include products to access movies or other types of entertainment and gaming products. In some instances, a benefit included in a product to access movies can include a guaranteed number of free-of-charge admission tickets to a movie theater. In addition, or in other instances, such a benefit can include a defined discount per admission ticket to a movie theater after a free-of-charge admission tickets have been exhausted. In some embodiments, a first gaming product of the gaming products can include an application that can be downloaded to the mobile device 120 and can permit playing a game (e.g., riddles, puzzles, crosswords, and the like) to earn credit towards defined merchandise and/or credit to offset delivery service fees. The first gaming product and the merchandise can be specific to a retailer, for example. In other embodiments, a second gaming product of the one or more gaming products also can be downloaded to the mobile device 120 and can permit earning credits to a utility bill, a credit card bill, a revolving load installment, or the like. Such credits can be earned, for example, by responding to surveys that can be presented via the application in the mobile device. The second gaming product can be specific to a utility company, a lender, or the like. Again, in some embodiments, at least some of the foregoing services and products can include numerous types.

The user is to then select individual ones (referred to here as individually selectable products and services, rather than pre-bundled) by selecting (e.g., tapping, swiping, or the like) respective selectable option boxes 140a-140j.

In one embodiment, the selected option boxes 140 of the pre-bundled group or the individually selected variety of products and services are signaled to the service provider system 110, by the application program 123 or by the web site, and are then identified in the service provider system 110 by a stored data structure (not shown). Such data structure can represent one or more bundles available to the service provider system 110. The data structure can be retained within one or more memory elements 166 (generically referred to as bundles 166). It is also contemplated that such a data structure may also be stored in the mobile device 120 as part of the application program 123. The latter may be accessed and configured or updated, remotely by the service provider system 110.

In one embodiment, the stored data structure contains an indicator that one or more of the insurance products or services identified therein (either as part of the pre-bundled group or as part of the individually selectable variety) can be offered to the user at a "group rate" that is cheaper than a "market price" of that product or service. The market price may be the insurance premium amount that would be charged to the user if the user were an individual customer of an insurance service provider or other type of service provider (other than the telecommunication service provide) who is actually providing the offered product or service. This advantageous result of obtaining a cheaper rate for users of mobile devices (an instance of which is the mobile device 120) may be possible due to the telecommunication service provider (that is linked to the mobile devices) being able to leverage its customer base (the users of mobile devices that have purchased prepaid phone plans from the telecommunication service provider), for collective bargaining with the original insurance service providers who are underwriting the insurance products or with the underlying service providers who are actually providing the other services, all of which may fall under the "Benefit" rubric described above and referred to in the drawings here, that are now being offered to the users of the mobile devices.

Still referring to FIG. 1, the application program 123, in response to receiving product selection information, e.g. as a finger presses against a touchscreen of the mobile device 120, of a pre-bundled group or an individually selectable variety of products and services, sends the user's election to the service provider system 110. In other embodiments, as is illustrated in FIG. 4C, a user interface that includes a list of products offered at a group rate can include a selectable visual element 430. Selection of the selectable visual element 430 causes the mobile device 120 to send election information indicative of a defined selection of at least some of the products offered at the group rate. The election information can be determined based at least on a selection of a particular group of the selectable visual elements 402, 404, 406, 408, 410, 412, 414, 416, 418, 420, 422, 424, 426, and 428.

Regardless the manner in which selection information is submitted, the service provider system 110 can calculate the cost of providing the user's elected benefits (insurance services and/or other services, for example) in response to receiving the election information. In some embodiments, the service provider system 110 can determine such a cost based at least on a set of defined rules stored in or otherwise available to the service provider system 110. The set of defined rules can govern the cost of various combinations of those benefits. In some embodiments, as is illustrated in FIG. 1A, the server device 115 can include a cost evaluation subsystem 156 that can determine the cost of a specific combination of elected products. The set of defined rules can be retained within one or more memory elements 168 (generically referred to as billing rules 168).

The service provider system 110 may then generate a telecommunication service bill that references the user account corresponding to the mobile device 120, with the telecommunication service provider, or refers to the prepaid telecommunication service plan including a telecommunication charge 142 for telecommunication services used, and also indicates the calculated cost or charge of providing the user's elected benefits, e.g., insurance or other services, as a benefits charge 143, in addition to a total charge 146 (that includes the sum of the telecommunications charge 142 and the benefits charge 143). This is also referred to here as a composite bill—see FIG. 5 for an example. In one embodiment, it is the service provider system 110 that calculates the cost of providing the user's selection of the benefits, based on the set of defined rules governing the cost of various combinations of services. As is illustrated in FIG. 1A, the server device 115 can include a billing subsystem 158 that can generate the telecommunication service bill. The set of defined rules can be retained within the billing rules 168.

In another embodiment, a calculator program is provided as part of the application program 123 that is stored in the mobile device 110, such that upon selection of the benefits by the user (the option boxes 140 have been pressed—see FIGS. 4A, 4B), it is the application program 123 itself (the calculator program therein) that calculates the benefits charge 143 and then displays this charge to the user, without having to signal and then wait for a response from the service provider system 110. This is particularly advantageous for the user because the user immediately obtains a price quote for the benefits the user has just elected. The calculator program (as part the application program 123, for example) may be updated remotely from time to time by the service provider system 110, so that the latest benefits and their prices are readily available to the user as the user's situation changes over time, enabling the user to efficiently adapt her selection of non-telecommunication benefits (in response to, for example, a new notification being sent from the service provider system 110 prompting the user to update a benefits package of the user).

Upon or after the user has confirmed to the service provider system 110, via interaction with the application program 123, that she wishes to be covered by the elected insurance services or wishes to subscribe to the other services, the composite bill (see FIG. 5) is sent to the user's mobile device 120, e.g., via email or via the application program 123. In this manner, through the use of the mobile platform and notification technology described above, the user of a prepaid telecommunication service is provided with insurance services (the elected pre-bundled group or the individually selectable variety) at a cheaper rate than the market price of those services, thereby decreasing the likelihood of the user departing to sign up with a competitor telecommunication service provider.

The notifications sent by the service provider system 110 as described above may be SMS or MMS messages addressed to a phone number of the mobile device 120; push notifications, which use push technology; in-app messages that appear only when the user is active in an application; or email. Push notifications may originate from a server. Typically, an end user of push technology must opt-in to receive notifications; opt-in usually takes place during an installation process that executes on the mobile device 120, once the user has purchased the prepaid plan. An advantage of push notifications is that the technology doesn't require specific applications on the mobile device 120 to be open, in order for a notification to be received. This allows a smartphone (being an example of the mobile device 120) to receive and display social media and text message alerts even when the smartphone's screen is locked and the social media application that is pushing the notification is closed.

Different mobile devices and services rely on different methods to deliver push notifications. Developers of applications, web sites, or APIs for ANDROID and APPLE devices can use APIs to have their apps deliver push notifications to the mobile devices 120. Another approach is to use mobile backend as a service (mobile BaaS) cloud services to provide push notification functionality for a mobile app.

In other embodiments, however, the notifications delivered from the service provider system 110 may be a SMS message, a MMS message, or other types of messages that are addressed to the assigned phone number of the mobile device 120. In that case, the text message may contain a hyperlink that is represented as the launch prompt (when the text message is displayed in the mobile device 120) and has been inserted by the service provider system 110. When pressed or otherwise selected, the hyperlink may cause the application program 123 that is stored in the mobile device 120 to be "web application viewable", within the web browser 124, which in turn prompts the user (e.g., displays the appropriate text on the touch screen of the mobile device 120) to enter into application 123 the minimum personal information necessary to qualify the user as an "insured" of either a pre-bundled group or an individually selectable variety, of insurance products and services. The application program 123 then communicates the personal information entered by the user, to the service provider system 110.

In some embodiments, when the service provider system 110 delivers a notification to the mobile device 120, a timestamp can be recorded in the service provider system 110. If a response to the notification is not received from the mobile device 120 (e.g., from the application program 123) within a specified period of time after that which is indicated in the timestamp, then a second notification (whose content may be similar to that of the first notification in that it will include both the launch prompt 137 and the reminder prompt 136) will automatically be delivered, from service provider system 110 to the mobile device 120. This helps ensure that a reasonable effort has been made to reach out to the user with the launch prompt.

It yet another embodiment, the mobile device 120 may receive the notification delivered from service provider system 110 as a hyperlink within an email message that has been addressed to the user's email address (in this case, the user is deemed a "known" user). When the hyperlink (that is in the email message) is pressed by the user, the application program 123 is launched. Again, the application program 123 may be a native application or a web application viewable within a web browser 124 running in the mobile device 120. Alternatively, pressing the hyperlink in the email message may cause the web browser 124 to navigate to a Web site through which the personal information is obtained from the user (via entry into the web browser 124).

In one embodiment, when both the first notification and the subsequent, second notification are delivered (for example when the interval following the initial time stamp has reached and no response to the first notification has been received at the programmed processor), they are delivered during the first half of a billing cycle that immediately follows the minimum eligibility period defined above (e.g., 30 days).

FIG. 2 illustrates a flow diagram of an example method for precipitating a user of the mobile device 120 to accept a pre-bundled or individually selectable variety of insurance products and services that are on offer from the telecommunication service provider. As mentioned, the telecommunication service provider provides voice service, messaging service (e.g., SMS messaging service and/or MMS messaging service), and data services (e.g., Internet access services, access to cloud services, or the like) to the user, via the mobile device 120.

In particular, the example method 200 includes a series of interactions between the mobile device 120, the user and the service provider system 110. Note in this case that the existing telecommunication service plan, which has been agreed upon between the user and the service provider, need not be a prepaid plan but instead may be a long term (e.g., 24 months) installment contract. The example method 200 begins with a first notification 222 being presented to the user. The first notification 222 can be sent to the mobile device 120 after a user account linked to the mobile device 120 has been active during a minimum eligibility period.

Next, where the user responds to the first notification 222 by electing to provide a minimum amount of personal information required to take advantage of an offer for a pre-bundled or individually selectable variety of insurance products and services, the application program 123 is launched in the mobile device 120 through which the user enters her personal information. Alternatively, where the first notification 222 may be a SMS message or an MMS message that contains a hyperlink inserted by the telecommunication service provider, the election by the user causes the web browser 124 in the mobile device 120 to navigate to a website (e.g., a mobile-optimized website) that is identified via the hyperlink. As another alternative, the election to provide the minimum personal information may be communicated or signaled back to the service provider system 110 via an API. A response to the first notification 222 can include an election to be reminded later of the offer. Electing to be reminded of the offer at a later time can cause the service provider system 110 to send (later) a second notification 223 to the mobile device 120.

An example of the first notification 222 and the second notification 223 as displayed in the mobile device 120 are shown in FIGS. 3A and 3B, respectively. As is illustrated, the reminder prompt 136 and the launch prompt 137 are visible side by side and selectable via, for example, an interaction (e.g., a tap, a swipe, or the like) with a touchscreen display device of the mobile device 120. Other arrangements of the reminder prompt 136 and the launch prompt 137 also can be implemented.

An election of the launch prompt 137 in connection with the first notification 222 or the second notification 223) can cause the application program 123 to be launched or the browser to come to foreground and navigate to a previously identified web site. The application program 123, or in the web browser 124 at the website, can then prompt entry of personally identifiable information. The entered personal identifiable information can be sent to the service provider system 110.

In response to receiving the personal information, the service provider system 110 can determine (e.g., compute or looks up) available benefits for which the user would be eligible (based at least on the user's minimum personal information, for example) and sends to the application program 123 a list of those benefits consisting of a pre-bundled group and/or an individually selectable variety, of insurance products and services. The service provider system 110, in response to then receiving, via the application program 123 or via the web browser 124 at the web site, the user's election as between the pre-bundled group or the individually selectable variety, offers via the application program 123 or via the web browser 124 at the web site, an insurance service contract to the user, at a group rate that is cheaper than the market price of the elected insurance services individually.

In one embodiment, the notification 222 is a push notification containing a launch prompt and a remind later prompt, such that the user elects to provide the minimum required personal information by pressing the launch prompt, or elects to be reminded later of the offer by pressing the remind prompt. Where the user presses the launch prompt, application program 123 is launched. Where the user presses the remind prompt, the second notification 223 containing for example the same launch and reminder later prompts, can be presented to the user with a predetermined time interval after the first notification 222 was delivered.

It is contemplated that the second notification 223 could alternatively not contain the reminder prompt 136, but instead contain the launch prompt 137 and a "No Thanks" prompt (not shown). The user may elect to provide the minimum required personal information by pressing the launch prompt, or she may elect to no take advantage of the offer and to no longer receive any notifications of the offer, by pressing the no thanks prompt.

In another embodiment, when the first notification 222 is a hyperlink within an SMS message or another type of message, such that the user may elect to provide the minimum personal information required by clicking the hyperlink (which then prompts the user with the various fields of the minimum personal information), the user may alternatively refrain from clicking on the hyperlink. In that case, following a time out interval (after the hyperlink is first displayed to the user), the service provider system 110 can treat the lack of response in this case to be a request to be reminded later, in which case the second notification 223 is then sent (here as a hyperlink within a new SMS message or another type of message). Alternatively, the lack of a response (the hyperlink is not clicked, pressed or otherwise selected within a predetermined time interval after its display, for example), may be interpreted by the service provider system 110 as an election to not take advantage of the offer and also to not be reminded of the offer (in which case the second notification 223 is not delivered).

In yet another embodiment, the first notification 222 and the second notification 223 are hyperlinks within respective email messages.

A benefit in a user account is not static. As mentioned, a bundle of products or another type of group of products included in the user account can be modified as a function of time. A product can be added to a bundle and/or a product included in the bundle can be modified. Such additions and changes can be based on numerous factors, such as updates to personal information within a user account and/or changes to a level of prepaid service retained for a mobile device (e.g., number of minutes retained, number of messages retained, or amount of data retained).

Figure 6:
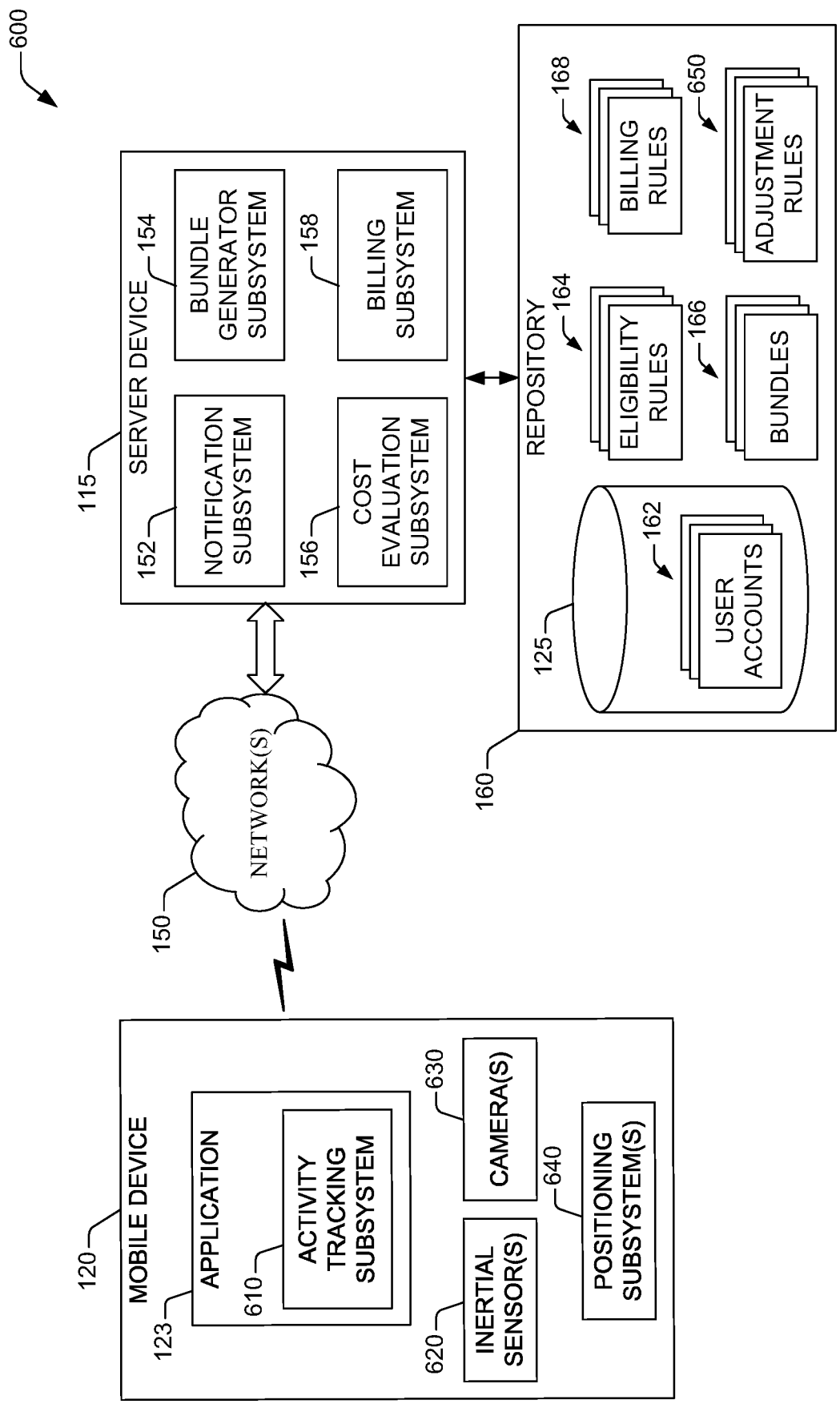
FIG. 6 illustrates an example of an operational environment in accordance with one or more embodiments of the disclosure.

In some instances, the telecommunication service provider can leverage the administration of bundles and the administration of the prepaid telecommunication service to customize a bundle, or a product in the bundle, based on data representative of utilization of a mobile device. FIG. 6 illustrates an example of an operational environment 600 for customization of a benefit using at least tracking data, in accordance with one or more embodiments of the disclosure. The operational environment 600 includes a mobile device 120 corresponding to a user account configured with a benefit that includes a group of products. As mentioned, the mobile device 120 is provisioned for a prepaid plan (e.g., a voice prepaid plan, a messaging plan, and/or a data plan) included in a prepaid telecommunication service. The mobile device 120 includes an activity tracking subsystem 610 that can collect several types of data representative of the utilization of the mobile device 120. While the activity tracking subsystem 610 is illustrated as included in the application 123, the disclosure is not limited in that respect and the activity tracking subsystem 610 can be present in a different section of the mobile device 120.

The mobile device 120 can execute the activity tracking subsystem 610 to initiate tracking of a specific activity. In one example, the activity can be associated with motion of the mobile device 120 and the activity tracking subsystem 610 can cause one or more inertial sensors 620 to generate data indicative of the motion of the mobile device. In some embodiments, each of the inertial sensor(s) 620 can be embodied in a solid-state accelerometer and/or a solid-state gyroscope. As such, at least one of the inertial sensor(s) 620 can generate first inertial data indicative of acceleration of the mobile device 120 and/or second inertial data indicative of heading of the mobile device 120. One or more camera(s) 630 includes in the mobile device 120 can generate imaging data while the mobile device 120 is in motion.

In scenarios in which the mobile device 120 operates within a vehicle (not depicted in FIG. 6), the inertial data and/or the imaging data can provide information representative of the movement of the vehicle. Such movement can, in turn, reveal how the vehicle (an automobile, a motorcycle, etc.) is operated by an end-user of the mobile device 120 while the vehicle traverses a defined road itinerary. Therefore, at least some of such inertial data can be utilized to customize a product related to operation of the vehicle. To that end, the mobile device 120 can send the inertial data and/or the imaging data to the server device 115. Prior to sending such data, in order to avoid incurring charges against a quota of a prepaid data plan retained in a user account corresponding to the mobile device 120, the activity tracking subsystem 610 can tag at least a portion of the inertial data and/or a portion of the imaging data with metadata indicative of non-prepaid service data. Thus, the mobile device 120 can send tagged inertial data and/or tagged imaging data to the server device 115.

In one embodiment, the cost evaluation subsystem 156 can receive such tagged data and can determine an adjustment to a premium or price point of vehicular insurance that is provided in a bundle of the user account corresponding to the mobile device 120. The cost evaluation subsystem 156 can determine the adjustment to the premium based at least on the tagged inertial data and/or the tagged imaging data.

The adjustment to the premium need not improve the benefit. Thus, the cost evaluation subsystem 156 can determine if the adjustment reduces the premium. In an instance in which the adjustment increases the premium, the server device 115 can implement an exception handling process. In some embodiments, the bundle generator subsystem 154 can implement the exception handling. As part of such implementation, the bundle generator subsystem 154 can generate a recommendation for another type of insurance for the user account corresponding to the mobile device 120. In addition, or in another embodiment, the bundle generator subsystem 154 can cause the notification subsystem 152 to send a notification to the mobile device 120 that the activity being tracked can cause an increase in the premium of vehicular insurance. Further, or in yet another example, the bundle generator subsystem 154 can cause the notification subsystem 152 to send a notification that includes educational resources (articles, hyperlinks to articles, hyperlinks to websites, etc.) that can facilitate avoiding causing reductions in the adjustment of benefit(s) in the user account.

In an instance in which the adjustment increases the premium, the cost evaluation subsystem 156 can update the user account corresponding to the mobile device 120 in order to reflect the adjustment. The cost evaluation subsystem 156 can cause the notification subsystem 152 to send a notification of the adjustment of premium to the mobile device 120.

It is noted that by sending tagged data as described herein, the mobile device 120 can potentially access an improved product, as a reward for good operation of the vehicle, without detriment to the prepaid data plan that services the mobile device 120. For instance, user accounts in a particular user segment (e.g., teenagers, young adults, senior citizens, recipient of welfare benefits, and the like) can receive bonus airtime and/or bonus data in response to maintaining good driving habits.

Other forms of tracking can be contemplated. Regardless the type of tracking data, service bonuses and/or discounts in a premium of a bundle of products can further mitigate attrition of users of prepaid telecommunication services, particularly in light of the discount being attained changes to a rate of data consumption in a prepaid data service or a rate of consumption of minutes (or airtime) in a prepaid plan. As an illustration, in a scenario in which a user account corresponding to the mobile device 120 includes an entertainment product including movies access. The telecommunication service provider can collect data indicative of the movie attendance of the mobile device 120, including data indicative of a movie that has been attended and/or a movie theater where the movie has been watched. As is illustrated in FIG. 6, the mobile device 120 can include one or more positioning subsystems 640 (e.g., a GPS receiver device and related circuitry) that can permit or otherwise facilitate generate an estimate of a current location of the mobile device 120. In some embodiment, the activity tracking subsystem 610 can cause the mobile device 120 to present a prompt to permit collection of such data from a third-party application (e.g., a social media application). In some embodiments, the activity tracking subsystem 610 can cause a browser application (not depicted in FIG. 6) in the mobile device 120 to navigate to a website where such authorization can be configured.

In response to the activity tracking subsystem being authorized to collect the data, the mobile device can generate a record of a movie that is attended and/or another record of a theater or location where the movie is attended. The activity tracking subsystem 610 can send such records to the service device 115. Similar to other tracking data, the records can be tagged with respective metadata indicative of the records constituting non-billable data. Thus, the server device 115 can avoid accruing charges toward a quota of data in a prepaid data plan utilized by the mobile device 120.

Using at least a portion of such records data, the bundle generator subsystem 154 can customize a product of a bundle included in the user account corresponding to the mobile device 120. Such customization can permit the service provider system 110 to provide differentiated discounts for certain movies. For example, movies having a specific actor or actress in the cast can be discounted or movies within a specific genre can be discounted. The longer a mobile device consumes a prepaid service, the more precise the discounts become. Thus, attrition may be less likely. Further, the more precise a customized bundle is, the less likely the mobile device 120 is to terminate a prepaid plan.

In addition, or in other embodiments, the mobile device 120 biometric sensor devices (not depicted in FIG. 6). In a scenario in which a user account associated with the mobile device 120 includes wellness product, the activity tracking subsystem 610 can provide (e.g., send or make available) biometric data to the server device 115. In such a scenario, the activity tracking subsystem 610 also can provide inertial data to the server device 115. Such data can be sent continuously, periodically, according to a schedule, or in response to an event. Transmission of tagged biometric data and/or tagged inertial data can be performed without accruing charges against a quota of data of a prepaid plan of the mobile device 120.

In some embodiments, the cost evaluation subsystem 156 can monitor changes in biometric markers based at least on the biometric data and can adjust a premium of a healthcare insurance and/or a wellness product included in the user account corresponding to the mobile device 120. For instance, improvement in biometric markers can result in a reduction in the premium.

Bundle of services can be synergistic. Biometric markers can be improved not only because of increased activity, but also because of dietary changes that can be promoted by having access to a food delivery service (which can be part of a bundle of wellness products) that provides discounts on certain foodstuffs typically included in particular diets, such as a low-carb diet, a ketogenic diet a low-fat-high-protein diet, and the like.

Figure 7:
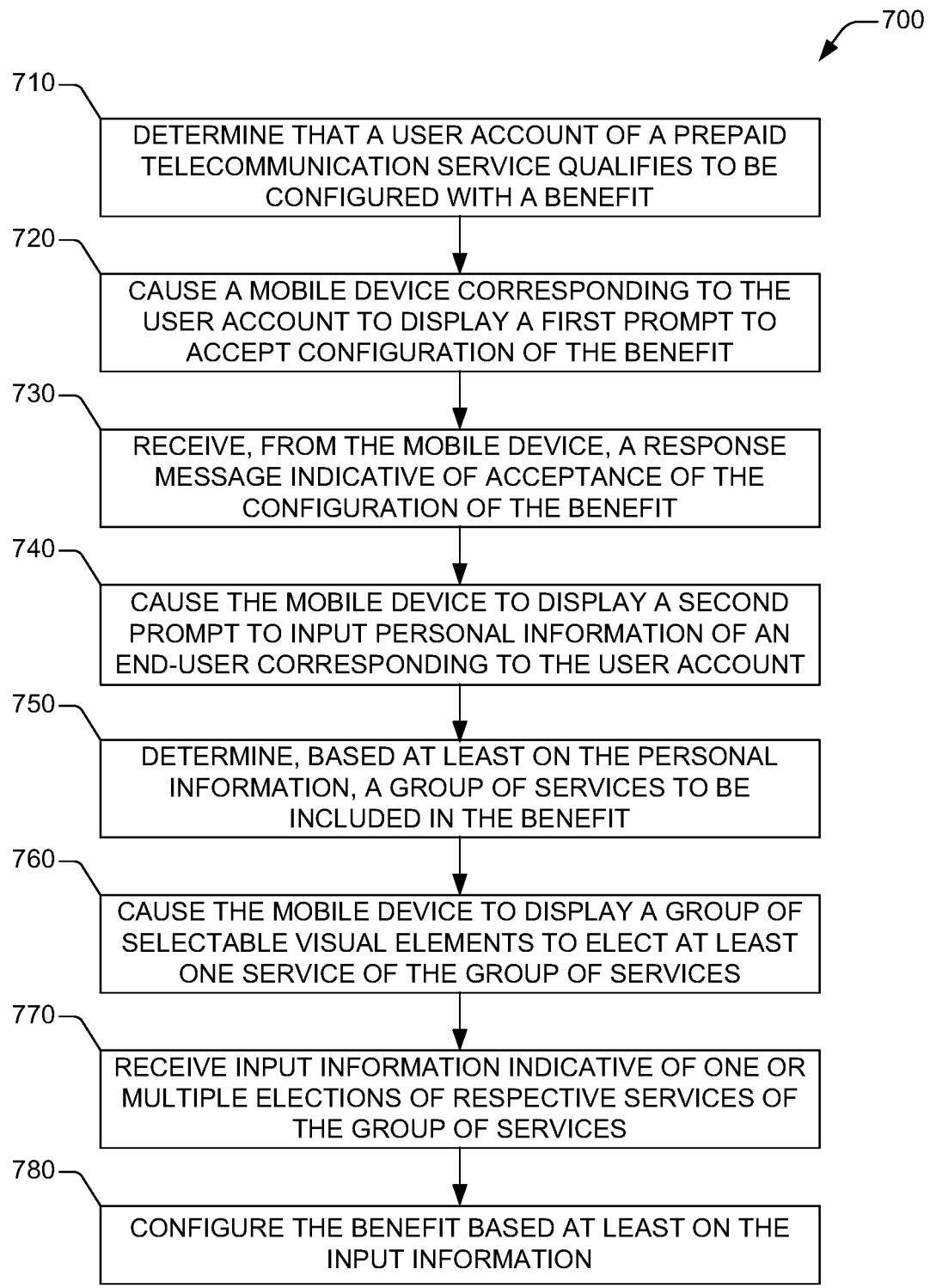
FIGS. 7-9 illustrate example of a methods in accordance with one or more embodiments of the disclosure.
Figure 8:
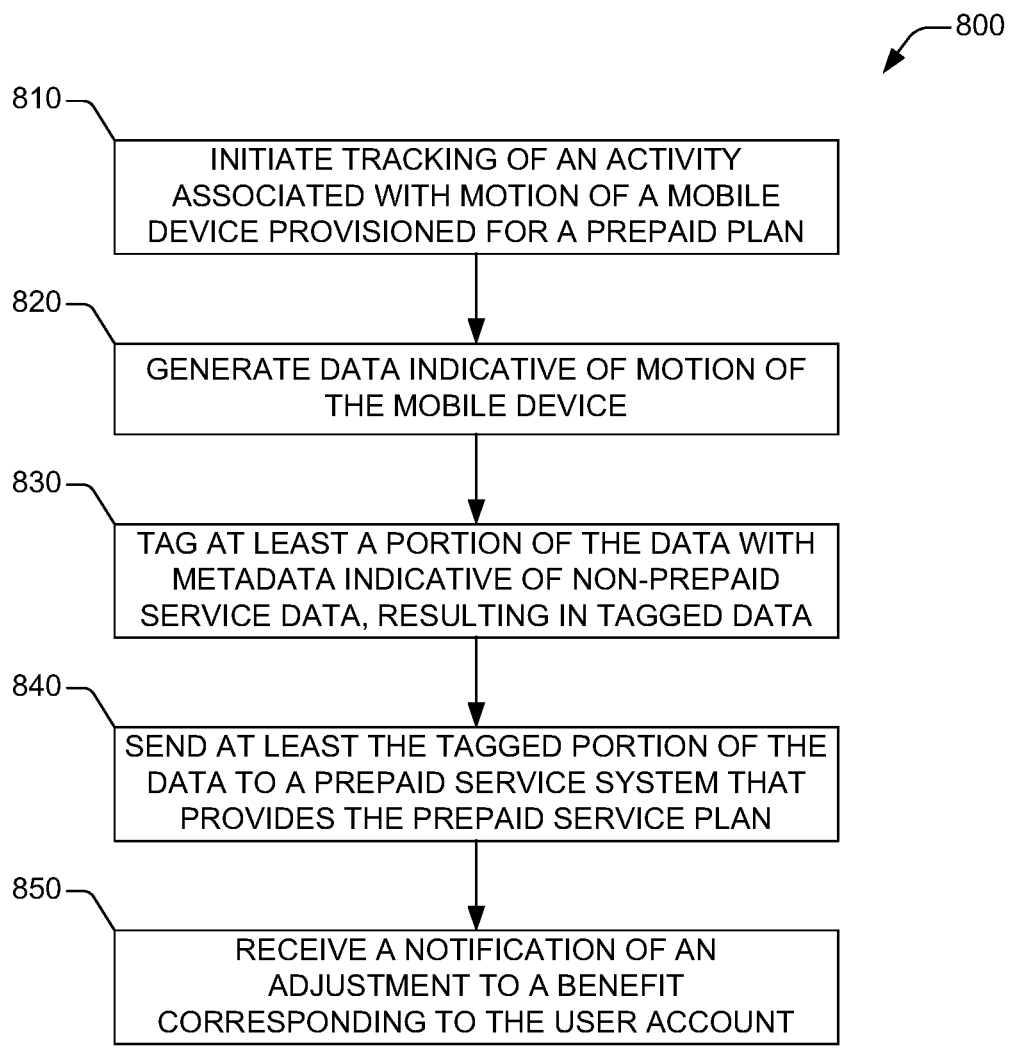
Figure 9:
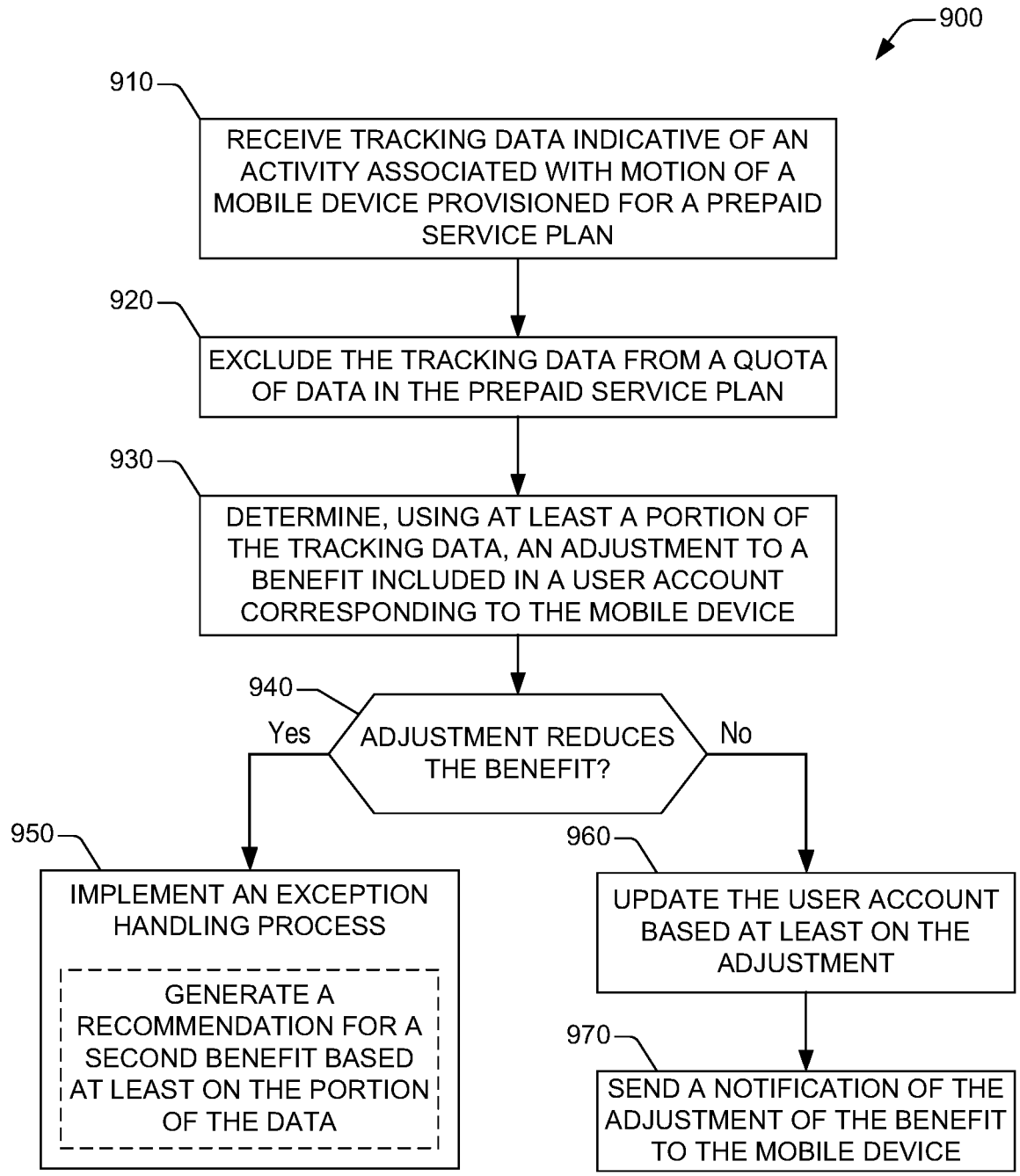

FIGS. 7-9 illustrate example of techniques that emerge from the present specification. In particular, FIG. 7 illustrates a flowchart of an example of a method 700 for configuring a benefit, in accordance with one or more embodiments of the disclosure. A computing system can implement, entirely or partially, the example method 700. The computing system includes one or more processors, one or more memory devices, and/or other types of computing resources that permit or otherwise facilitate, individually or in combination, implementing the example method 700. In some embodiments, the computing system can embody or can include at least the prepaid service system 110.

At block 710, the computing system can determine that a user account of a prepaid telecommunication service qualifies to be configured with a benefit. As mentioned, the prepaid telecommunication service can include a prepaid plan, such as a voice prepaid plan, a messaging prepaid plan, and/or a data prepaid plan. Determining that such a user account qualifies to be configured with the benefit, the computing system can apply one or more eligibility rules to information included in the user account.

At block 720, the computing system can cause a mobile device (e.g., mobile device 110) corresponding to the user account to present a first prompt to accept configuration of the benefit. The mobile device (e.g., mobile device 120) is provisioned with the prepaid plan. At block 730, the computing system can receive a response message from the mobile device (e.g., mobile device 110) where the response message is indicative of acceptance of the configuration of the benefit. At block 740, the computing system can cause the mobile device (e.g., mobile device 110) to present a second prompt to input personal information of an end-user corresponding to the user account. At block 750, the computing system can determine, based at least on the personal information, a group of services to be included in the benefit. At block 760, the computing system can cause the mobile device to present a group of selectable visual elements to select at least one service of the group of services. At block 770, the computing system can receive input information indicative of one or multiple elections of respective services of the group of services. At block 780, the computing system can configure the benefit based at least on the input information.

FIG. 8 illustrates a flowchart of an example of a method 800 for providing data to adjust a benefit, in accordance with one or more embodiments of the disclosure. A mobile device can implement, entirely or partially, the example method 800. The mobile device includes one or more processors, one or more memory devices, and/or other types of computing resources that permit or otherwise facilitate implementing the example method 800. In some embodiments, the mobile device can embody or can include the mobile device 120.

At block 810, the mobile device can initiate tracking of an activity associated with motion of the mobile device. The mobile device is provisioned for a prepaid plan (e.g., a voice prepaid plan, a messaging plan, and/or a data plan) included in a prepaid telecommunication service.

At block 820, the mobile device can generate data indicative of the motion of the mobile device. In some embodiments, as is disclosed herein, one or more inertial sensor devices (e.g., a solid-state accelerometer and/or a solid-state gyroscope) integrated into the mobile device can generate the data.

At block 830, the mobile device can tag at least a portion of the data with metadata indicative of non-prepaid service data, resulting in tagged data. As mentioned, by tagging at least the portion of the data, the tagged data can be excluded from accrual toward a quota of a prepaid data plan. At block 840, the mobile device can send the tagged data to a prepaid service system that provides the prepaid service plan, such as the prepaid service system 110. At block 850, the mobile device can receive a notification of an adjustment to a benefit corresponding to the user account.

FIG. 9 illustrates a flowchart of an example of a method 900 for configuring a benefit, in accordance with one or more embodiments of the disclosure. A computing system can implement, at least partially, the example method 900. The computing system includes one or more processors, one or more memory devices, and/or other types of computing resources that permit or otherwise facilitate implementing the example method 900. In some embodiments, the computing system can embody or can include at least the prepaid service system 110.

At block 910, the computing system can receive tracking data indicative of an activity associated with motion of a mobile device provisioned for a prepaid service plan. As is disclosed herein, the activity can include the operation of a vehicle or physical activity performed by an end-user of the mobile device.

At block 920, the computing system can exclude (or, in some embodiments, can configure for exclusion) the tracking data from a quota of data in the prepaid service plan.

At block 930, the computing system can determine, based at least on a portion of the tracking data, an adjustment to a benefit included in a user account corresponding to the mobile device. In some embodiments, the adjustment can include a change in the cost (e.g., an insurance premium) of maintaining the benefit in the user account. In addition, or in other embodiments, the adjustment can include a change to eligibility for a second benefit. Further, or in yet other embodiments, the adjustment can include a change in scope of the benefit the is included in the user account, such as a change in an amount of a current benefit or a change to eligibility for another category of the benefit.

As is disclosed herein, an adjustment to the benefit need not improve the benefit. Thus, at block 940, the computing system can determine if the adjustment reduces the benefit. In response to an affirmative determination ("Yes" branch in FIG. 9), the computing system can implement an exception handling process. For example, in some embodiments, implementing the exception handling process can include generating a recommendation for a second benefit based at least on the portion of the data relied on (at least partially) to determine the adjustment. In addition, or as another example, implementing the exception handling process can include sending a notification to the mobile device that the activity can cause a reduction in the benefit. Further, or in yet another example, implementing the exception handling process can include sending a notification that includes educational resources (articles, hyperlinks to articles, hyperlinks to websites, etc.) that can facilitate avoiding causing reductions in the adjustment of benefit(s) in the user account.

In response to a negative determination ("No" branch in FIG. 9) at block 940, the flow of the example method 900 is directed to block 960, in which the computing system can update the user account based at least on the adjustment. At block 970, the computing system can send a notification of the adjustment of the benefit to the mobile device.

Figure 10:
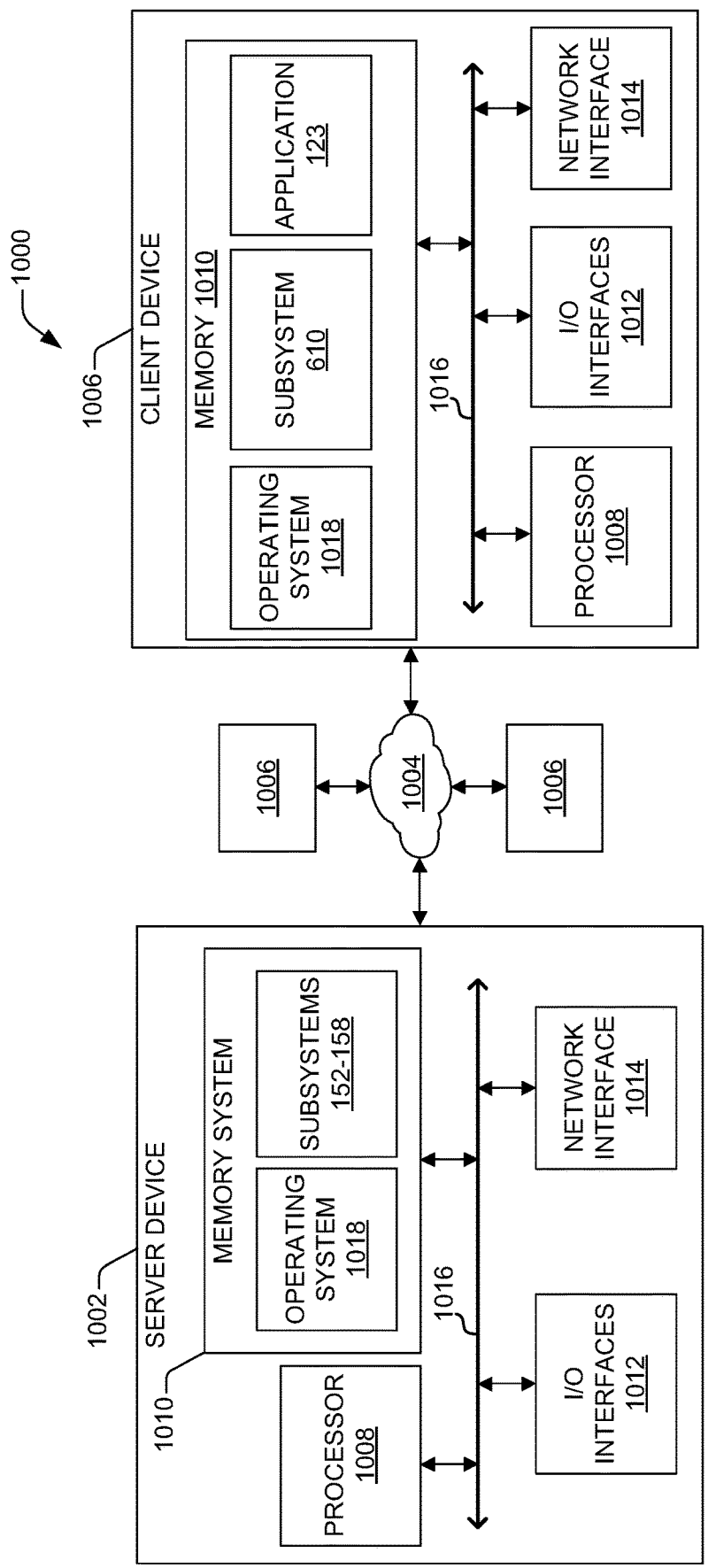
FIG. 10 illustrates an example of a computing environment in accordance with one or more embodiments of the disclosure.

FIG. 10 illustrates a block diagram of an example of a computing environment 1000 comprising non-limiting examples of a server device 1002 (server device 115) and a client device 1006 (e.g., mobile device 120) functionally coupled (e.g., communicatively coupled) by means of one or more networks 1004 (generically referred to as network 1004). The network 1004 can be embodied in or can include the network 150. The server device 1002 can comprise one or multiple computing devices configured to store one or more of the various subsystems 152-158. The client device 1006 can comprise one or multiple computing devices configured to operate a user interface, such as a smartphone. Multiple client devices 1006 can connect to the server device 1002 through one or multiple networks 1004, such as the Internet or any wired or wireless connection.

The server device 1002 and the client device 1006 can be a digital computer that, in terms of hardware architecture, generally includes one or multiple processors 1008 (generically referred to as processor 1008), a memory system 1010, input/output (I/O) interfaces 1012, and network interfaces 1014. These components (1008, 1010, 1012, and 1014) are communicatively coupled via a local interface 1016. The local interface 1016 can be embodied in or can include, for example, one or multiple buses or other wired or wireless connections, as is known in the art. The local interface 1016 can have additional elements, which are omitted for simplicity, such as controller devices, buffer devices (such as caches), drivers, repeater devices, and receiver devices, to enable or otherwise facilitate communications. Further, the local interface 1016 may include address, control, and/or data connections to enable or otherwise facilitate appropriate communications among the aforementioned components.

The processor 1008 can be a hardware device for executing software, particularly that stored in memory system 1010. The processor 1008 can be embodied in or can include any custom made or commercially available processor, a central processing unit (CPU), an auxiliary processor among several processors associated with the server device 1002 and the client device 1006, a semiconductor-based microprocessor (in the form of a microchip or chipset), or generally any device for executing software instructions. When the server device 1002 or the client device 1006 is in operation, the processor device 1008 can be configured to execute software stored within the memory system 1010, to communicate data to and from the memory system 1010, and to generally control operations of the server device 1002 and the client device 1006 pursuant to the software.

The I/O interfaces 1012 can be used to receive user input from and/or for providing system output to one or more devices or components. User input can be provided via, for example, a keyboard and/or a mouse. System output can be provided via a display device and a printer (not shown). I/O interfaces 1012 can include, for example, a serial port, a parallel port, a Small Computer System Interface (SCSI), an IR interface, an RF interface, and/or a universal serial bus (USB) interface.

One or multiple network interfaces 1014 (generically referred to as network interface 1014) can be used to transmit and receive from an external server device 1002 or a client device 1006 on one or several of the network(s) 1004. The network interface 1014 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi), or any other suitable network interface device. The network interface 1014 may include address, control, and/or data connections to enable appropriate communications on the network(s) 1004.

The memory system 1010 can include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 1010 may incorporate electronic, magnetic, optical, and/or other types of storage media. Note that the memory system 1010 can have a distributed architecture, where various components are situated remote from one another, but can be accessed by the processor 1008.

The software in memory system 1010 may include one or more software programs, each of which comprises an ordered listing of executable instructions for implementing logical functions. In the example of FIG. 10, the software in the memory system 1010 of the server device 1002 can comprise one or more of the subsystems 152-158 and a suitable operating system (O/S) 1018. In the example of FIG. 10, the software in the memory system 1010 of the client device 1006 can comprise the application 123 and subsystem 610, and a suitable operating system (O/S) 1018. While the application 123 and the subsystem 610 are illustrated as separate block, such blocks can be consolidated into a single unit in some embodiments. The operating system 1018 essentially controls the execution of other computer programs, such as the application 123 and, in some embodiments, the subsystem 610, and can provide scheduling, input-output control, file and data management, memory management, and communication control and related services.

For purposes of illustration, application programs and other executable program components such as the operating system 1018 are illustrated herein as discrete blocks, although it is recognized that such programs and components can reside at various times in different storage components of the server device 1002 and/or the client device 1006. An implementation of the subsystems 152-158 and/or the application 123 and the subsystem 610 can be stored on or transmitted across some form of computer readable media. Any of the disclosed methods can be performed in response to execution (by the processor 1008, for example) of computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   determining, by a computing system including at least one processor, that a user account of a telecommunication prepaid service qualifies to be configured with a benefit;
   causing, by the computing system, a mobile device corresponding to the user account to display a first prompt to accept configuration of the benefit, the mobile device being provisioned with a prepaid plan of the prepaid telecommunication service;
   receiving, by the computing system, from the mobile device, a response message indicative of acceptance of the configuration of the benefit;
   causing, by the computing system, the mobile device to display a second prompt to input personal information of an end-user corresponding to the user account;
   determining, by the computing system, based at least on the personal information, a group of products to be included in the benefit, each one of the group of products administered by a telecommunication carrier system that provides the telecommunication prepaid service;
   causing, by the computing system, the mobile device to display a group of selectable visual elements to elect at least one product of the group of products;
   receiving, by the computing system, input information indicative of one or multiple elections of respective products of the group of products;
   configuring, by the computing system, the user account with the benefit based at least on the input information;
   receiving, by the computing system, from the mobile device, tracking data indicative of an activity associated with motion of the mobile device, the tracking data including metadata indicative of the tracking data being non-billable;

excluding, by the computing system, the tracking from a quota of data in the prepaid plan; and determining, by the computing system, based at least on a portion of the tracking data, an adjustment to the benefit.

2. The method of claim 1, wherein the determining that the user account of the telecommunication prepaid service qualifies to be configured with the benefit comprises determining that the user account satisfies at least one of a threshold uninterrupted activity period or a threshold amount of expenditure on the telecommunication prepaid service.

3. The method of claim 1, wherein the causing the mobile device corresponding to the user account to display the first prompt comprises sending at least one of a push notification message, a short message service (SMS) message, or an multimedia message service (MMS) message.

4. The method of claim 1, wherein the determining, based at least on the personal information, the group of products comprises determining one or more of an insurance product, a lifestyle product, or an entertainment product, wherein the insurance product comprises catastrophic healthcare insurance, basic healthcare insurance, a dental plan, a vision plan, or an involuntary unemployment insurance product, and wherein the lifestyle product comprises one of a rideshare service, a wellness product, a grocery discount product, and wherein the entertainment product comprises one of a subscription to digital books, an access plan to movies, or a gaming product.

5. The method of claim 1, wherein the determining, based at least on the personal information, the group of products comprises determining, based at least on the personal information, one or more of an amount of the benefit or a type of a first product of the group of products.

6. The method of claim 1, further comprising determining, by the computing system, that the user account qualifies to be configured with a second benefit, an amount of the benefit is less than a second amount of the second benefit.

7. The method of claim 1, wherein the configuring comprises determining a fee structure of the respective products by applying a group of billing rules to the input information, the group of billing rules dictates a cost of each one of the respective products; and configuring a billing cycle for the respective products and the prepaid plan.

8. The method of claim 1, further comprising, determining, by the computing system, that the adjustment augments the benefit;

updating, by the computing system, the user account based at least on the adjustment; and sending, by the computing system, a notification of the adjustment to the mobile device.

9. The method of claim 1, further comprising, determining, by the computing system, that the adjustment reduces the benefit; and generating, by the computing system, a recommendation for a second benefit based at least on the portion of the tracking data.

10. A system, comprising:

at least one memory device having instructions stored thereon; and at least one processor functionally coupled to the at least one memory device and configured to execute the instructions at least to determine that a user account of a telecommunication prepaid service qualifies to be configured with a benefit;

cause a mobile device corresponding to the user account to display a first prompt to accept configuration of the benefit, the mobile device being provisioned with a prepaid plan of the prepaid telecommunication service;

receive, from the mobile device, a response message indicative of acceptance of the configuration of the benefit;

cause the mobile device to display a second prompt to input personal information of an end-user corresponding to the user account;

determine, based at least on the personal information, a group of products to be included in the benefit, each one of the group of products administered by a telecommunication carrier system that provides the telecommunication prepaid service;

cause the mobile device to display a group of selectable visual elements to elect at least one product of the group of products;

receive input information indicative of one or multiple elections of respective products of the group of products;

configure the user account with the benefit based at least on the input information;

receive, from the mobile device, tracking data indicative of an activity associated with motion of the mobile device, the tracking data including metadata indicative of the tracking data being non-billable;

exclude the tracking from a quota of data in the prepaid plan; and determine based at least on a portion of the tracking data, an adjustment to the benefit.

11. The system of claim 10, wherein to determine that the user account of the telecommunication prepaid service qualifies to be configured with the benefit comprises, the at least one processor is further configured to execute the instructions to determine that the user account satisfies at least one of a threshold uninterrupted activity period or a threshold amount of expenditure on the telecommunication prepaid service.

12. The system of claim 10, wherein to determine, based at least on the personal information, the group of products, the at least one processor is further configured to execute the instructions to determine one or more of an insurance product, a lifestyle product, or an entertainment product, wherein the insurance product comprises catastrophic healthcare insurance, basic healthcare insurance, a dental plan, a vision plan, or an involuntary unemployment insurance product, and wherein the lifestyle product comprises one of a rideshare service, a wellness product, a grocery discount product, and wherein the entertainment product comprises one of a subscription to digital books, an access plan to movies, or a gaming product.

13. The system of claim 10, wherein to determine, based at least on the personal information, the group of products, the at least one processor is further configured to execute the instructions to determine, based at least on the personal information, one or more of an amount of the benefit or a type of a first product of the group of products.

14. The system of claim 10, wherein the at least one processor is further configured to determine that the user account qualifies to be configured with a second benefit, an amount of the benefit is less than a second amount of the second benefit.

15. The system of claim 10, wherein the at least one processor is further configured to,
    receive, from the mobile device, tracking data indicative of an activity associated with motion of the mobile device;
    exclude the tracking from a quota of data in the prepaid plan; and
    determine, based at least on a portion of the tracking data, an adjustment to the benefit.

16. The system of claim 15, wherein the at least one processor is further configured to,
    determine that the adjustment augments the benefit;
    update the user account based at least on the adjustment; and
    send a notification of the adjustment to the mobile device.

17. At least one non-transitory computer-readable storage device having instructions stored thereon that, in response to execution, cause at least one computing device to perform or facilitate operations comprising:
    determining that a user account of a telecommunication prepaid service qualifies to be configured with a benefit;
    causing a mobile device corresponding to the user account to display a first prompt to accept configuration of the benefit, the mobile device being provisioned with a prepaid plan of the prepaid telecommunication service;
    receiving, from the mobile device, a response message indicative of acceptance of the configuration of the benefit;
    causing the mobile device to display a second prompt to input personal information of an end-user corresponding to the user account;
    determining, based at least on the personal information, a group of products to be included in the benefit, each one of the group of products administered by a telecommunication carrier system that provides the telecommunication prepaid service;
    causing the mobile device to display a group of selectable visual elements to elect at least one product of the group of products;
    receiving input information indicative of one or multiple elections of respective products of the group of products;
    configuring the user account with the benefit based at least on the input information;
    receiving, from the mobile device, tracking data indicative of an activity associated with motion of the mobile device, the tracking data including metadata indicative of the tracking data being non-billable;
    excluding the tracking from a quota of data in the prepaid plan; and
    determining based at least on a portion of the tracking data, an adjustment to the benefit.

18. The at least one non-transitory computer-readable storage device of claim 17, wherein determining that the user account of the telecommunication prepaid service qualifies to be configured with the benefit comprises determining that the user account satisfies at least one of a threshold uninterrupted activity period or a threshold amount of expenditure on the telecommunication prepaid service.

19. The at least one non-transitory computer-readable storage device of claim 17, wherein determining, based at least on the personal information, the group of products comprises determining one or more of an insurance product, a lifestyle product, or an entertainment product,
    wherein the insurance product comprises catastrophic healthcare insurance, basic healthcare insurance, a dental plan, a vision plan, or an involuntary unemployment insurance product, and
    wherein the lifestyle product comprises one of a rideshare service, a wellness product, a grocery discount product, and
    wherein the entertainment product comprises one of a subscription to digital books, an access plan to movies, or a gaming product.

* * * * *